W. LIVINGSTON.
PULLEY WHEEL.
APPLICATION FILED NOV. 4, 1914.

1,135,595.

Patented Apr. 13, 1915.

Walter Livingston
Inventor,
by
Attorneys.

Witnesses

UNITED STATES PATENT OFFICE.

WALTER LIVINGSTON, OF HASTINGS, NEBRASKA.

PULLEY-WHEEL.

1,135,595.  Specification of Letters Patent.  Patented Apr. 13, 1915.

Application filed November 4, 1914. Serial No. 870,230.

*To all whom it may concern:*

Be it known that I, WALTER LIVINGSTON, a citizen of the United States, residing at Hastings, in the county of Adams and State of Nebraska, have invented a new and useful Pulley-Wheel, of which the following is a specification.

The present invention appertains to pulley wheels, and aims to provide a novel and improved device of that character which is particularly applicable for small pulleys, such as the fan belt pulley of an automobile.

It has not infrequently been the cause of annoyance and trouble in certain types of motor vehicles, for the pin of the fan belt pulley to become loosened, and to cut or tear the belt and catch in the frame, with resultant damage to the machine.

This invention contemplates the provision of a pulley wheel of unique construction, and provided with means for retaining the locking pin in place, whereby it cannot move outwardly into engagement with the belt. It is also within the scope of the invention, to provide a pulley wheel of the nature indicated, which will be comparatively simple, non-encumbering and inexpensive in construction, which may be readily manufactured and assembled, and which will be convenient, efficient and thoroughly practical in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1:
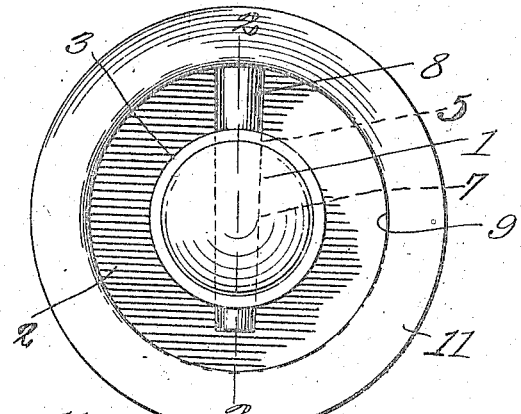
Figure 2:
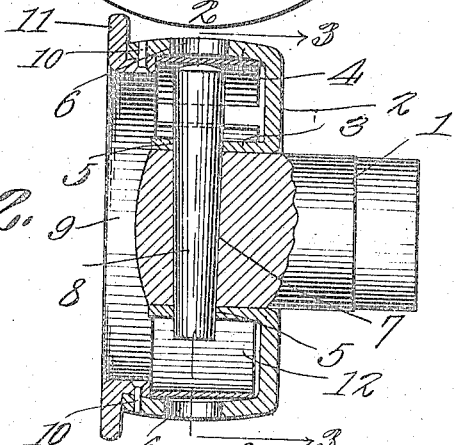
Figure 3:
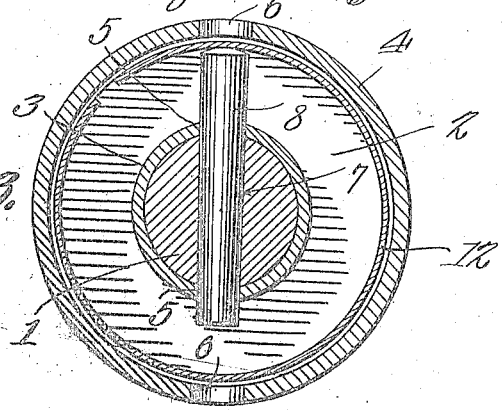

Figure 1 is a front view of the improved pulley wheel. Fig. 2 is a sectional view on the line 2—2 of Fig. 1, and Fig. 3 is a sectional view on the line 3—3 of Fig. 2.

In the drawing, the numeral 1 designates the shaft, which may be taken to represent the fan shaft of a motor vehicle, although it is to be understood that the present pulley wheel may be employed for various purposes. The pulley wheel is preferably pressed or otherwise formed from a blank of sheet metal, so as to assume the form of an annular channel 2, the inner flange 3 of which forms the hub of the pulley wheel, and the outer flange 4 of which, provides the rim of the pulley wheel. The rim 4 is curved transversely for the proper engagement of the belt therearound. The outer flange or rim 4 of the pulley wheel is preferably slightly wider than the inner flange or hub 3, and the pulley wheel is adapted to be slipped onto the end of the shaft 1 with the back of the pulley wheel disposed innermost, and so that the mouth or recess of the pulley wheel will face outwardly or forwardly.

The hub 3 of the pulley wheel is provided with diametrically opposite apertures 5, and the rim 4 of the pulley wheel is provided with diametrically opposite apertures 6 alining with the apertures 5, while the shaft 1 is provided with a bore or opening 7 with which the apertures 5 are arranged to aline when the pulley wheel is slipped onto the shaft. A tapered locking pin 8 is insertible through one of the apertures 6 in the rim of the pulley wheel, and into the apertures 5 of the pulley wheel hub and opening 7 of the shaft 1, to lock the pulley wheel in place upon the shaft.

A ring or annulus 9 is fitted or slipped within the edge of the rim 4 of the pulley wheel, and is provided with an annular exterior flange 11 bearing against the edge of the pulley wheel rim 4, and projecting beyond the rim of the pulley wheel for holding the belt upon the pulley wheel. The ring 9 may be secured within the edge portion of the pulley wheel rim 4, by means of rivets 10, or other suitable securing means.

A resilient leaf spring 12 is bent into circular form, and is arranged to be snapped within the rim 4 of the pulley wheel, so as to expand against the rim of the pulley wheel between the ring 9 and the back of the pulley wheel, so as to close the aperture 6 of the pulley wheel rim and thereby prevent the locking pin 8 from loosening and working outwardly through one of the apertures 6 to cut or injure the belt, or cause other damage.

The pin retaining spring or band 12 may be readily snapped through the ring 9 after the locking pin 8 is driven into place for locking the pulley wheel upon the shaft, whereby the pin will be held in place to the ends desired. The retaining spring or band 12 may also be contracted and drawn outwardly through the ring 9 when it is desired to release and remove the pin 8.

With the present pulley wheel, there is no liability of the pin becoming loosened to loosen the pulley wheel or injure the belt, and assurance is had, that the pulley wheel will effectively serve its purpose without fail.

Having thus described the invention, what is claimed as new is:—

1. A pulley wheel embodying a rim and hub apertured for the insertion of a locking pin through the rim and into the hub, and a band within the rim for holding the pin in place.

2. A pulley wheel embodying a rim and hub apertured for the insertion of a locking pin through the rim and into the hub, and a resilient expansible band fitting within the rim to hold the pin in place.

3. A pulley wheel embodying an annular channel whose inner and outer flanges provide a hub and rim, respectively, the rim and hub being apertured for the insertion of a locking pin, and a band fitting in the rim for holding the pin in place.

4. A pulley wheel embodying an annular channel whose inner and outer flanges provide a hub and rim, respectively, the rim and hub being apertured for the insertion of a locking pin, and a resilient expansible band fitting within the rim to hold the pin in place.

5. A pulley wheel embodying an annular channel whose inner and outer flanges provide a hub and rim, respectively, the rim and hub being apertured for the insertion of a locking pin, a ring engaged within the edge of the rim, and a band fitting within the rim between the ring and back of the channel.

6. A pulley wheel embodying an annular channel whose inner and outer flanges provide a hub and rim, respectively, the rim and hub being apertured for the insertion of a locking pin, a ring engaged within the edge of the rim, and a resilient expansible band sprung within the rim between the ring and back of the channel.

7. A pulley wheel embodying an annular channel whose inner and outer flanges provide a hub and rim, respectively, the rim and hub being apertured for the insertion of a locking pin, a ring engaged within the edge of the rim and having a flange resting against the edge of the rim and projecting beyond the rim, and a band fitting within the rim between the ring and back of the channel.

8. A pulley wheel embodying a rim and hub apertured for the insertion of a locking pin through the rim and into the hub, and means to lie between the pin and rim for holding the pin in place.

9. A pulley wheel embodying an annular channel whose inner and outer flanges provide a hub and rim, respectively, the rim and hub being apertured for the insertion of a locking pin through the rim and into the hub, and means to lie between the pin and rim for holding the pin in place.

In testimony that I claim the foregoing as my own, I have hereto affixed my signature in the presence of two witnesses.

WALTER LIVINGSTON.

Witnesses:
J. HUERLING,
F. L. YOUNGBLOOD.